United States Patent

[11] 3,618,783

| [72] | Inventor | Kenneth W. Cuyler<br>Deerfield, Ill. |
|---|---|---|
| [21] | Appl. No. | 867,333 |
| [22] | Filed | Oct. 17, 1969 |
| [45] | Patented | Nov. 9, 1971 |
| [73] | Assignee | William W. Nugent & Co., (Inc.)<br>Skokie, Ill. |

[54] FILTER
6 Claims, 5 Drawing Figs.

[52] U.S. Cl. .................................................. 210/492
[51] Int. Cl. .................................................. B01d 29/34
[50] Field of Search .......................................... 210/488, 492

[56] References Cited
UNITED STATES PATENTS

| 2,495,095 | 1/1950 | Ewbank | 210/492 |
| 2,604,994 | 7/1952 | Vocelka | 210/492 |
| 2,682,953 | 7/1954 | Gunn | 210/492 |
| 3,397,794 | 8/1968 | Toth et al. | 210/488 |

*Primary Examiner*—John Adee
*Attorney*—Fitch, Even, Tabin & Luedeka

ABSTRACT: A filter having a plurality of axially aligned and axially spaced flat annular disks of filtering material separated by inner and outer support members alternating axially with the respective disks and having radial spokes providing axial support for the central portions of the disks intermediate their peripheries and terminating in circumferentially widened portions cooperating with adjacent support members to define inlet and outlet openings communicating with the spaces between the disks for the flow of fluid axially through the disks.

PATENTED NOV 9 1971      3,618,783
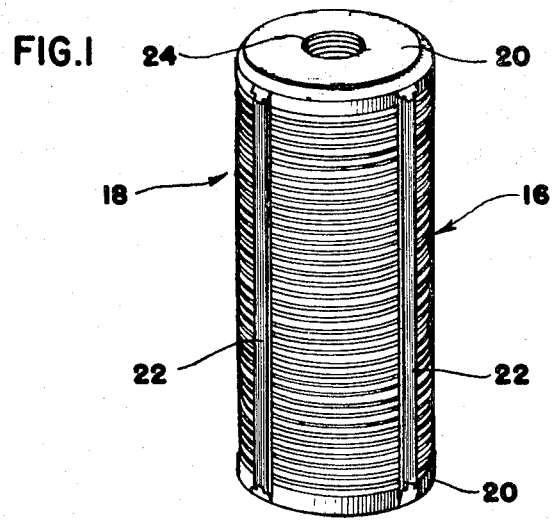
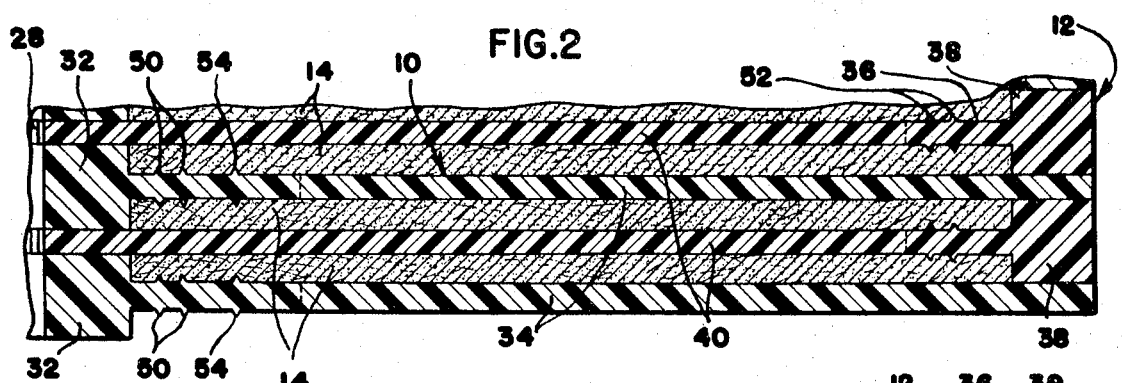
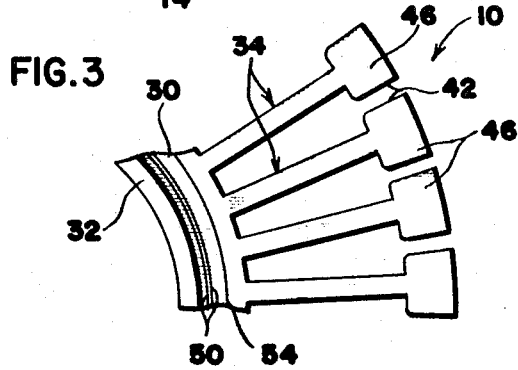
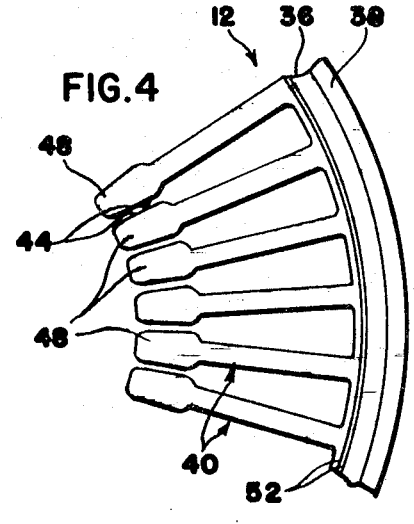
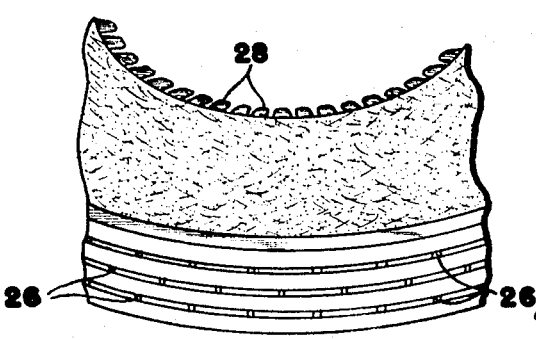
INVENTOR
KENNETH W. CUYLER
*Anderson, Luedeka, Fitch, Even & Tabin*
ATTYS.

FILTER

The present invention relates generally to filters and, more particularly, to supporting members for flat annular disks of filter material alternating with the supporting members in axial alignment in a stack and adapted to filter fluid flowing axially through the disks between inlet and outlet passageways opening radially with respect to the stack at the peripheries of the disks. The stack is used in a filter having a cartridge (sometimes referred to as a "recharge") and used extensively in the filtering of liquids such as oil, the disks being formed of a fibrous material such as woodpulp, paper, felt or the like. An example of such disks and a cartridge formed therefrom is found in U.S. Pat. No. 2,604,994 which issued July 29, 1952. During use the cartridge is placed in a vessel or housing in communication with a conduit carrying fluid to be filtered and the fluid is pumped under pressure into and out of the vessel. In the cartridge, the fluid flows from the exterior of the stack first radially and inwardly through inlet passageways, then axially through the filter disks, and finally radially and inwardly through outlet passageways to the open inner periphery of the stack, from which it flows to an outlet opening of the vessel. Within the cartridge, the parts thereof are retained in assembled relation by the application of an axial compressive force.

The support members include flat rings engaging inner and outer peripheral portions of the disks in radially overlapping relation and having radiating spokes providing axial support for intermediate parts of the disks between their peripheries. Within the inner peripheries of the disks and outwardly beyond their outer peripheries, axially projecting inner hubs and outer rims on the members engage the ends of the spokes to sustain the axial compressive forces in the stack and define inlet and outlet openings for fluid flow to and from the spaces between the spokes and disks.

It is a principal object of the invention to provide a filter of the above character in which the support members are constructed in a novel manner to force fluid to flow axially through the disks rather than in a bypassing path radially along axially facing surfaces of the disks.

A more detailed object is to construct the spokes in a novel manner to avoid axial collapse of the disks into the inlet and outlet openings.

A further detailed object is to form each support member with a novel rib arrangement providing dams against undesired radial fluid flow along the surfaces of the disks.

Other objects and advantages of the invention will become apparent with reference to the following description and the accompanying drawings.

In the drawings:

FIG. 1 is a perspective view of a filter cartridge having disks and support means therefor embodying various features of the present invention;

FIG. 2 is a fragmentary diametrical sectional view of the cartridge of FIG. 1;

FIG. 3 is a fragmentary plan view of one support member;

FIG. 4 is a fragmentary plan view of another support member; and

FIG. 5 is a fragmentary perspective view showing the cartridge partially assembled without an end plate.

In the drawings, the invention is shown for purposes of illustration embodied in inner and outer support members 10 and 12 for a plurality of disks 14 which are aligned axially with the support members and alternate with them in a stack 16 in a cartridge 18. The cartridge, in addition to the stack of disks and the support members, includes end plates or bezels 20 and straps or bands 22 which extend between and are attached at their opposite ends to the end plates to apply an axial pressure to maintain the cartridge parts assembled with the stack of disks between the end plates.

The cartridge 18 is adapted to be used in conjunction with a filter vessel (not shown) similar to that shown in U.S. Pat. No. 2,604,994. Although this vessel will not be described in detail herein, it may be assumed that it includes an inlet which communicates with the external or outer cylindrical surface of the cartridge and an outlet which communicates with the interior or central opening of the cartridge through central apertures 24 in the end plates. It may also be assumed that the disks and their support means are compressed axially within a suitable press and are bound by the end plates 20 and straps 22 while in the compressed state.

The disks 14 are flat annular members made of a fibrous filtering material such as woodpulp, paper, felt or the like and they alternate in the cartridge with the inner and outer support members 10 and 12. The latter sustain the axial compression within the cartridge 18 and cooperate to define inlet and outlet passageways 26 and 28 for directing the flow of fluid first from the exterior of the cartridge and radially and inwardly to spaces between the filter disks, then axially through the disks to remove foreign matter from the fluid, and finally radially and inwardly from the spaces between the disks and to the interior of the cartridge from which it flows through the central apertures 24 in the end plates. The support members engage each other axially within the inner peripheries of the disks and outwardly beyond their outer peripheries to sustain the axial compressive force retaining the cartridge parts assembled. The support members, in order to sustain the axial compressive force retaining the parts assembled are formed of a material which, as contrasted to the material of the filter disks, is relatively rigid. One material found to be satisfactory is polypropylene.

The inner support members 10 (FIG. 3) occupy alternating ones of the spaces between the disks 14 and each comprises a thin, flat inner ring 30 having an inner periphery at least as small in radius as the inner peripheries of the disks. These rings are aligned axially with the inner peripheral portions of two adjacent disks and engage such portions in radially overlapping relation to provide axial support for these portions. Formed integrally with and projecting axially in each direction from the inner periphery of the flat, inner ring of the inner support member is a hub 32 (FIGS. 2 and 3). The hub projects axially in each direction from the ring a distance equal approximately to the thickness of the disks, the latter in this instance having a thickness on the order of a few thousandths of an inch greater than the axial projection of the hub in each direction. Radiating from the outer periphery of the inner ring of each support member and extending across and between adjacent ones of the disks 14 to provide lateral support for the central portions of the disks between their peripheries are a plurality of inner spokes 34. The spokes are of the same thickness axially as the inner ring 30 of the support member and extend radially beyond the outer peripheries of the disks so as to be clamped between rims 38 of the outer support members 12, hereinafter described.

The outer support members 12 (FIG. 4) are located in the spaces between the disks 14 intervening between the spaces occupied by the inner support members 10. Each of the outer members comprises a thin, flat outer ring 36 having an outer periphery at least as large in radius as the outer peripheries of the disks. The outer rings are aligned axially with the disks and each engages the outer peripheral portions of two adjacent disks in radially overlapping relation. Formed integrally with the outer peripheries of the outer rings of the outer support members are rims 38 (FIGS. 2 and 4) which project axially in both directions from the rings and engage the outer end portions of the inner spokes 34 of the inner support members 10. As in the case of the hubs 32 of the inner support members, the rims in this instance project axially from the outer rings in each direction a distance a few thousandths of an inch less than the thickness of the disks. Radiating inwardly from the inner periphery of the outer ring of each outer support member are a plurality of outer spokes 40 which extend first across and between two adjacent disks to provide lateral support for their central portions and then project radially beyond the inner peripheries of the disks where they are clamped between the hubs 32.

With the outer end portions of the inner spokes 34 clamped between the rims 38, the axially facing sides of the rims and the radially extending side edges 42 of the spokes define the inlet passageways 26. The outlet passageways 28 similarly are defined by the axially facing sides of the hubs 32 and the radially extending side edges 44 of the outer spokes 40.

In accordance with one aspect of the invention the spokes 34 and 40 are constructed in a novel manner to prevent collapse or deflection of the filter material of the disks 14 axially into the inlet and outlet passageways 26 and 28 with the attendant bypassing fluid flow along the axially facing side of the filter disks rather than axially through the disks. For this purpose, the outer end portions of the inner spokes 34 are widened circumferentially as indicated at 46 and the inner end portions of the outer spokes 40 are widened circumferentially as indicated at 48, the widened portions 46 of the inner spokes 34 extending radially and inwardly from the inner periphery of the rims 38 a short distance and the widened portions 48 of the outer spokes 40 extending radially and outwardly from the inner periphery of the hubs 32 a short distance. For a purpose to appear later, the widened inner end portions 48 of the outer spokes 40 have a dimension measured radially approximating the radial width of the inner rings 30 of the adjacent inner support members 10 in the stack 16 and the widened outer end portions 46 of the inner spokes 34 have a dimension measured radially which approximates the radial width of the outer rings 36 of the adjacent outer members 12 in the stack. Due to the widening of the end portions of the spokes, the inlet and outlet passageways 26 and 28 are narrowed, but the filter material adjacent the passageways is supported axially over a greater area.

To assist in preventing bypassing fluid flow other than axially through the filter disks 14, the invention also contemplates a novel construction of the inner and outer rings 30 and 36 of the support members 10 and 12. The axially facing area of the inner ring 30 overlapping the filter disk radially thus is correlated with and made approximately the same as the area of the outer ring 36 in radially overlapping relation with the outer peripheral portions of the filter disks. The radial extension of the inner ring 30 from the hub then is greater than the radial extension of the outer ring 36 from the rim.

Another feature of the inner and outer rings 30 and 36 preventing bypass fluid flow is the formation on each side of each ring of at least one circular rib concentric with and projecting axially from the ring a distance less than the axial projection of the rims 38 and hubs 32 from the rings, the ribs projecting into the adjacent overlapping peripheral portions of the filter disks 14 to form dams preventing fluid flow radially along the axially facing surfaces of the disks and past the ribs, thereby forcing the fluid to flow axially through the disks. Preferably, these are two closely spaced ribs 50 provided on each side of the inner rings and two similarly closely spaced ribs 52 on each side of the outer rings to provide a double dam. Also, the inner ring being wider radially than the outer ring, there is room for a third rib to be added on each side of the inner ring as indicated at 54 and it is preferred that this be done. The purpose of the radial extent of the widened portions 46 and 48 referred to above is to provide backing for the overlapping portions of the filter disks in engagement with the ribs.

In assembling the parts of the cartridge 18, the stack 16 is formed by placing a filter disk 14 on an outer support member 12 with the outer periphery of the disk located within the rim 38 of the support member and with the outer ring 36 of the member and its ribs 52 underlying the outer peripheral portion of the ring and the outer spokes 40 extending radially across and beneath the disk. Then, an inner support member 10 is placed on the disk in axial alignment therewith. The hub 32 of the inner support member extends through the hole in the filter disk and engages the upper sides of the inner end portions 48 of the outer spokes 40 of the outer support member. The underside of the inner ring 30 of the inner support member with the ribs 50 and 54 then overlaps the inner peripheral portion of the filter disk and the inner spokes 34 extend radially across the disk and beyond the outer periphery of the disk and onto the upper edge of the rim 38 of the outer support member. Next another disk is laid on the inner support member with the hub of the latter projecting through the central hole of the disk. This process is repeated with the parts assembled in the same sequence throughout the cartridge. After the desired numbers of support members and disks are assembled, they are compressed and placed between the end plates, followed by application of the straps to hold the stack in a compressed state.

Within the compressed stack 16, the ribs 50, 52, and 54 press into the adjacent overlapping portions of the disks 14 backed by the widened end portions 46 and 48 of the spokes and prevent fluid flow along the axially facing sides of the disks past the ribs. Also, due to the support of the widened spoke end portions, any tendency of the disks to collapse into the inlet and outlet passageways 26 and 28 is avoided. Fluid flowing radially into the spaces between the disks thus is effectively forced to flow axially through the disks for a proper filtering action.

Various embodiments of the invention and modifications thereof other than that shown and described herein will be apparent to those skilled in the art from the foregoing description and are intended to fall within the scope of the accompanying claims.

What is claimed is:

1. In a filter, the combination of a plurality of imperforate, flat, annular disks of filter material having axially aligned central openings, a plurality of first support members of rigid material intermediate alternate disks, each first support member comprising a thin, flat inner ring having an inner diameter no greater than the inner diameter of said disks and aligned axially therewith and engaging the inner peripheral portions of two adjacent ones of said discs, a hub integral with the inner periphery of said ring and projecting axially in each direction therefrom a distance equal approximately to the thickness of one of said disks, and a plurality of inner central support parts extending generally radially outwardly from the outer periphery of said inner ring across and between adjacent ones of said disks, each of said inner rings having arcuate rib means concentric with and projecting axially from the ring on each side thereof a distance less than the projection of said hub from said ring, said rib being adapted to create and occupy an indentation in the overlapping inner peripheral portions of said adjacent disks incident to an axially oriented compressive force on said disks and support members to prevent the bypass of fluid radially along the surfaces of the disks rather than axially through the disks, second support members of rigid material alternating with said first members and disposed intermediate intervening ones of said disks, each of said second supporting members comprising a thin, flat outer ring having an outer diameter at least as great as the outer diameter of said disks and aligned axially therewith in engagement with the outer peripheral portions of two adjacent ones of said disks, a rim integral with the outer periphery of said outer ring and projecting axially in each direction therefrom a distance equal approximately to the thickness of each of said disks, and a plurality of outer central support parts extending inwardly from the inner periphery of said outer ring across and between adjacent ones of said disks, each of said outer rings having arcuate rib means concentric with and projecting axially from the ring on each side thereof a distance less than the axial projection of said rim on the ring, said rib being adapted to create and occupy an indentation in the overlapping outer peripheral portions of said adjacent disks incident to an axially oriented compressive force on said disks and support members to prevent the bypass of fluid radially along the surfaces of the disks rather than axially through the disks, and means applying an axial compressive force clamping said members and discs together axially to hold the same in assembled relation with said disks between said hubs and the rims of the members, said first and second support members cooperating to define first passageways extending radially inwardly from the outer periphery of said rims into spaces between said disks defined by said inner central support parts and second passageways extending radially outwardly from the inner periphery of said hubs and into spaces between discs defined by said outer central support parts, adjacent ones of said first and second passageways being in communication through said disks.

2. The combination of claim 1 in which two ribs of circular configuration are arranged in closely concentric relation and project from each side of each of said inner and outer rings to provide a double dam preventing bypassing fluid flow along the surface of the adjacent disks.

3. The combination of claim 1 in which the area of each axially facing side of said inner ring on each of said first support members in radially overlapping relation with said inner peripheral portion of an adjacent disk is equal approximately to the area of each axially facing side of said outer ring on each of said second support members in radially overlapping relation with said outer peripheral portion of an adjacent disk, whereby the axial force per unit area applied to each of said inner and outer peripheral portions of each of said disks is of approximately the same value.

4. The combination of claim 2 in which an additional circular rib projects outwardly from each side of said inner ring in concentric and radially spaced relation with said two ribs on the inner ring to provide a third dam to prevent bypassing fluid flow along the surface of the adjacent disks.

5. In a filter, the combination of a plurality of imperforate, flat, annular disks of filter material aligned axially and spaced apart axially, a plurality of first support members of rigid material extending into alternating ones of the spaces between said disks and each comprising a thin, flat inner ring having an inner periphery at least as small in radius as the inner peripheries of said disks and aligned axially with and engaging the inner peripheral portions of two adjacent ones of said disks in radially, overlapping relation, a hub integral with said inner periphery of said ring and projecting axially in each direction from the ring a distance equal approximately to the thickness of each of said disks, and a plurality of inner spokes radiating from the outer periphery of said inner ring across and between adjacent ones of said disks and having a substantially uniform axial thickness throughout their lengths equal to the thickness of the inner ring, the outer end portions of said spokes extending outwardly beyond said disks and being widened circumferentially with radially extending side edges spaced from the side edges of the outer end portions of adjacent spokes, second support members of rigid material alternating with said first members and extending into the intervening ones of said spaces between said disks, each of said second members comprising a thin, flat outer ring having an outer periphery at least as large in radius as the outer peripheries of said disks and aligned axially with and engaging the outer peripheral portions of two adjacent ones of said disks in radially overlapping relation, a rim integral with the outer periphery of said outer ring and projecting axially in each direction therefrom a distance equal approximately to the thickness of each of said disks, and a plurality of outer spokes radiating from the inner periphery of said outer ring across and between adjacent ones of said disks and having a substantially uniform axial thickness throughout their lengths equal to the thickness of the outer ring, the inner end portions of said spokes extending radially beyond said disks and being widened circumferentially with radially extending side edges spaced from the side edges of the inner end portions of adjacent spokes, and means applying an axial force clamping said members together axially to hold the same in assembled relation with said discs between said hubs and the rims of the members, with said outer end portions of said inner spokes clamped between said rims and cooperating therewith to define outer radially opening passageways, and with said inner end portions of said outer spokes clamped between said hubs and cooperating therewith to define inner radially opening passageways, said widened outer end portions of said inner spokes extending radially and inwardly from said rims and said widened inner end portions of said outer spokes extending radially and outwardly from said hubs to provide axial support for said discs adjacent said inlet and outlet passageways.

6. The combination of claim 5 in which each of said inner rings has at least one circular rib concentric with and projecting axially from the ring on each side thereof a distance less than the projection of said hub on the ring and each of said outer rings has at least one circular rib concentric with and projecting axially from the ring on each side thereof a distance less than the axial projection of said rim on the ring, said ribs pressing into said overlapping inner and outer peripheral portions of adjacent disks to prevent the bypass of fluid radially along the axially facing surfaces of the discs rather than axially through the disks.

* * * * *